(12) United States Patent
Saggau et al.

(10) Patent No.: US 7,227,127 B2
(45) Date of Patent: Jun. 5, 2007

(54) HIGH SPEED MICROSCOPE WITH THREE-DIMENSIONAL LASER BEAM SCANNING INCLUDING ACOUSTO-OPTIC DEFLECTOR FOR CONTROLLING THE LATERAL POSITION AND COLLIMATION OF THE LIGHT BEAM

(76) Inventors: Peter Saggau, 5005 Yoakum Blvd., Houston, TX (US) 77006; Duemani Reddy, 2121 El Paso, Unit 1602, Houston, TX (US) 77054; Vijay Iyer, 57 W. Neck Rd., Huntington, NY (US) 11743

( * ) Notice: Subject to any disclaimer, the term of this patent is extended or adjusted under 35 U.S.C. 154(b) by 0 days.

(21) Appl. No.: 11/245,410

(22) Filed: Oct. 6, 2005

(65) Prior Publication Data
US 2006/0071143 A1 Apr. 6, 2006

Related U.S. Application Data

(60) Provisional application No. 60/616,242, filed on Oct. 6, 2004.

(51) Int. Cl.
*H01J 3/14* (2006.01)
(52) U.S. Cl. .................... 250/235; 250/201.2; 250/216
(58) Field of Classification Search ................ 250/235, 250/201.2, 201.4, 216; 359/305–312; 347/234–248
See application file for complete search history.

(56) References Cited

U.S. PATENT DOCUMENTS 6,084,627 A * 7/2000 Cook et al. .................. 347/248

* cited by examiner

*Primary Examiner*—Que T. Le
(74) *Attorney, Agent, or Firm*—Conley Rose, P.C.

(57) ABSTRACT

A system and method for independently controlling the collimation and lateral positioning of a light beam comprises at least one acousto-optic deflector and a pair of counter propagating acoustic waves with offset frequencies. While the frequency offset controls the lateral positioning of the light beam, a frequency gradient across the acousto-optic deflectors controls the collimation of the light beam.

17 Claims, 10 Drawing Sheets

HIGH SPEED MICROSCOPE WITH THREE-DIMENSIONAL LASER BEAM SCANNING INCLUDING ACOUSTO-OPTIC DEFLECTOR FOR CONTROLLING THE LATERAL POSITION AND COLLIMATION OF THE LIGHT BEAM

CROSS-REFERENCE TO RELATED APPLICATIONS

The present application claims the benefit of U.S. Provisional Application Ser. No. 60/616,242, filed Oct. 6, 2004, entitled High Speed Microscope With Three-Dimensional Laser Beam Scanning, which is incorporated herein by reference.

SPONSORED RESEARCH OR DEVELOPMENT

This invention was made with government support under Grant No. DBI-0130852 awarded by the National Science Foundation

BACKGROUND OF THE INVENTION

1. Field of the Invention

The present invention generally relates to three-dimensional scanning with a light beam such as a laser. More particularly, the invention relates to high speed microscopy with three-dimensional laser beam scanning.

2. Description of Related Art

In experimental biology, increasing numbers of studies that are carried out on the cellular or sub-cellular level apply optical imaging techniques for combined structural and functional analysis of live nerve cells. Optical imaging approaches reduce the need for both post-experiment histology and invasive micropipette techniques during the experiment by enabling direct visualization of fine structures of interest and measurement of their function by means of fluorescent indicators, e.g. molecular or genetically encoded probes. Specifically in experimental neuroscience, optical techniques to probe membrane potential and intracellular ion concentrations of visually identified nerve structures have become a powerful tool to investigate many aspects of brain function. However, the requirements for functional imaging of living nerve cells demand imaging systems with spatial resolutions in the low to sub-micrometer range and frame rates of up several 1,000 per second.

Advanced imaging schemes such as confocal microscopy and multiphoton microscopy are increasingly employed in experimental neuroscience, since they significantly reduce light scattering related degradation in image quality, which is of particular importance in mammalian brain tissue. This property supports optically sectioning living biological specimens for computer-based three-dimensional reconstruction. While both microscope principles utilize point illumination from a laser source focused into a small spot, they differ in their concepts of fluorescence excitation and image formation. Confocal microscopy employs visible laser light for single-photon excitation and obstructs out-of-focus and scattered fluorescence by spatial filtering of the resulting image with a pinhole that is confocal with the illumination spot. Multiphoton microscopy uses infrared (IR) laser light, which is inherently less scattered due to its longer wavelength. Because of its lower energy, multiple photons have to be simultaneously absorbed to excite a single fluorescent molecule. This non-linear dependence on intensity limits the fluorescence excitation to a very small focal volume (rendering spatial filtering unnecessary as needed for confocal microscopy). In order to achieve a useful probability of multiphoton absorption events, extremely high photon flux is needed, which is achieved by the use of lasers emitting ultra-fast pulses in the high femtosecond (fs) to low picosecond (ps) range with accordingly high peak power, while maintaining biologically tolerable average power in the low milliwatt range (mW) at the preparation level.

With both of these schemes, the laser beam is commonly raster-scanned to obtain an image. The scanning principle generally employed is mechano-optical, i.e. galvanometer-driven mirrors; thus, inertia limits the speed of such systems. Therefore, while confocal and multi-photon microscopy have proven to be extremely useful in obtaining structural images, success of these techniques with functional imaging such as optical recording of neuronal activity has been limited, as neither raster-scanning nor random-access of multiple sites-of-interest is possible at the required rates. While video-rate imaging with multiphoton microscopy has been documented using resonant galvanometers or microlens arrays, neither of these support high-speed functional imaging. In general, existing confocal and multi-photon microscopes lack the spatio-temporal resolution necessary to measure fast multi-site optical signals from small brain structures. With these microscopes, the only possibility to achieve high frame rates necessary for functional imaging is to scan fewer or even single lines. Due to these constraints in scan patterns most microscopes cannot follow complex shaped biological structures such as neuronal dendrites.

In addition to the limited flexibility of lateral scan pattern, fast functional imaging of three-dimensional structures is practically impossible due to the low focusing speed of microscopes. The fastest and most precise change of focal plane can be obtained by piezo-actuators that are inserted between the microscope body and the objective lens. However, even these linear motors require axial step times (>10 ms) that are significantly longer per change of focus plane than the total time available to scan the entire volume-of-interest (<1 ms) containing many such planes. Even if faster methods to axially position the objective lens were available, resulting complications such as shock waves in the immersion solution would make these attempts fail because of movement artifacts interfering with delicate living tissue and patch-clamp seals.

Multiphoton laser scanning microscopy (MPLSM) has revolutionized fluorescence imaging in the field of biology by enhancing the quality of images obtained from optically thick tissue. Some of the most productive applications of MPLSM have been in the field of experimental neuroscience, where it has been used to study neurodegenerative diseases, synaptic plasticity, and neuronal integration in optically scattering live brain tissue. While the inherent sectioning ability, in combination with low levels of photodamage, provided by MPLSM has made it extremely useful for the structural imaging of small processes (e.g., dendritic spines ~1 um) deep within neuronal tissues, the low temporal resolution available in most commercial MPLSM systems has limited its applicability in functional imaging to studies that involve only a few sites of interest. This is mainly because the maximum speed of the commonly used galvanometer-based method of laser scanning is inherently limited by inertia. Therefore, in order to achieve the sampling speeds necessary for monitoring physiological signals such as intracellular calcium dynamics, users typically restrict their scan region to a single line. This not only significantly reduces the ability to accurately track physiological signals in complex shaped cells such as neurons, but also prevents the monitoring of signals from more than just a few sites of interest along a neuron.

In order to overcome this limitation, systems have been developed which combine the enhanced image quality provided by multiple advanced imaging techniques, including MPLSM, with the enhanced temporal resolution and scanning flexibility of acousto-optic deflectors (AODs) to enhance the study of neurophysiological processes. AODs utilize high frequency acoustic waves that are propagated in an acousto-optic (AO) medium as a tunable diffraction grating. Adjusting the frequency of the acoustic wave changes the diffraction angle and results in inertia-free beam deflection. By utilizing this property of AODs, these systems have been able to lower transition times between sites on a specimen to values in the low microsecond range (~20 µs) and remove any limit to the dwell time at a site. AODs have also allowed users to sample from any site in the specimen plane with the same transition time. As a result, it is possible to effectively monitor calcium transients along extensive regions of a neuron located deep in optically thick brain slices, a task which can not be performed with available commercial galvanometer-based confocal or multi-photon systems.

However, despite these enhancements in temporal resolution, the ability to effectively monitor signals at physiological speeds is limited to two-dimensional (2D) scans. This is because the inertia-free beam steering properties of AODs have thus far only been applied to lateral scanning while the axial position of the focus is adjusted by the same mechanism available in most commercial systems, i.e. raising or lowering the objective lens with an actuator. This moves the back focal aperture of the objective lens and, since the focal length of the objective lens remains constant, also moves the axial position of the focus by the same amount. Thus, the axial speed of laser scanning is inherently limited by the inertia of the objective lens and its actuator. Consequently, the highest speed at which the axial position of the focus can be moved, even with the fastest available commercial equipment commonly available (piezo-actuators capable of 10 ms per step), is still orders of magnitudes slower than the speed at which we are able to move the lateral position of the focus. This inability to effectively monitor physiological signals in three dimensions is a serious constraint in neuroscience, since neurons are complex three dimensional (3D) structures and develop in 3D networks.

There are different methods that have been proposed which would allow for laser scanning in the axial dimension. One of the most developed is the variable focal-length liquid-filled lens. The principal mechanism for changing the focal length within this type of lens relies on changing the pressure within a lens chamber, which in turn deforms an elastic membrane and changes the curvature of the lens. Recent developments have increased the maximum numerical aperture and the speed at which the focal position can be changed, but despite these improvements, the fastest variable focal length liquid-filled lenses typically still require at least one millisecond to change the focal position. Variable focal length lenses which use nematic liquid crystals or electro-optic materials to change the refractive index of the lens rather than the shape have also been developed. In general, for these types of lenses, generating fast response times requires restricting the thickness of the lens cell, which in turn severely limits the maximum change in focal length. Other mechanisms for variably adjusting focal length include using a deformable mirror, however this method also requires at least a millisecond to change the focal position and therefore is not suitable for applications that require frame rates greater than 1 kHz.

SUMMARY OF THE PREFERRED EMBODIMENTS

Preferred embodiments of the present invention comprise a scanning device to direct the focus of a light beam (such as a laser) to multiple predefined positions within a given volume. Preferred embodiments comprise an acousto-optically controlled light diffraction to independently change both collimation and direction of a laser beam. This inertia-free mechanism allows for very fast (microsecond range) three-dimensional positioning of the focus spot.

Embodiments of the present invention comprise a novel instrument for both structural and functional imaging studies of specimens such as living brain tissue. Certain embodiments use four AODs together with a commercial objective lens to deterministically and quickly (~30 µs) position the focus spot in a microscopic 3D volume via a remote focusing strategy, while other embodiments may use fewer AODs with multiple acoustic waves in an individual AOD. Embodiments of the present invention utilize counter-propagating acoustic waves in an AO medium, which have previously been used to demonstrate an effective method for spatial dispersion compensation in AO based MPLSM (AO-MPLSM).

In addition, embodiments of the present invention rely on continuously changing the frequency of the acoustic wave in the AO medium, a process which is known as 'chirping'. If the change in frequency is linear with time, the resulting angles of deflection at any particular time are similar to those for a cylindrical lens, but the axis of the deflection is also time-varying. The use of two AODs, in which the acoustic propagation directions are reversed, removes the time dependence of the deflection angle, and allows for a symmetrical cylindrical effect. Therefore, the collimation of a light beam can be controlled and the axial position of a focus spot can be varied.

Furthermore, embodiments of the present invention allow for independent control of lateral scanning with a light beam. As discussed in more detail below, control of the lateral scanning is accomplished by offsetting the frequencies of the acoustic waves that are passed through the AODs. The frequencies are offset such that for a given point in time and a given position on the AOD, the acoustic waves will have different frequencies. The ability to simultaneously and independently control both the lateral and axial position of a light beam focal point, through the use of counter-propagating acoustic waves with offset frequencies, provides for numerous benefits, including faster scan rates.

In addition, embodiments of the present invention inherently compensate for the decrease in resolution that results when AODs are used with MPLSM. The primary reason for this drop in resolution is spatial dispersion that results from the combination of the frequency-dependent AOD deflection angles with the ultra-fast pulses used in MPLSM. The result is a significant increase in the size of the focal volume, which decreases the spatial resolution. Left uncompensated, spatial dispersion can result in up to a 10 fold reduction in the resolution of images obtained via AO-MPLSM. Embodiments of the present invention incorporate an effective means of compensation that does not affect the ability to scan axially or laterally.

Embodiments of the present invention allow for fast concurrent imaging from multiple user-selected recording sites within a volume of tissue. Preferred embodiments of the present invention are of particular advantage in applications where three-dimensional imaging in living brain tissue of both structure and function of nerve cells is desired, e.g., imaging at high spatial resolution of small neuronal structures such as synaptic terminals or dendritic spines, and imaging at high temporal resolution of neuronal function such as rapid changes of intracellular ion concentrations in those microscopic structures.

BRIEF DESCRIPTION OF THE DRAWINGS

For a more detailed understanding of the preferred embodiments, reference is made to the accompanying Figures, wherein.

DETAILED DESCRIPTION OF THE PREFERRED EMBODIMENTS

Figure 1:
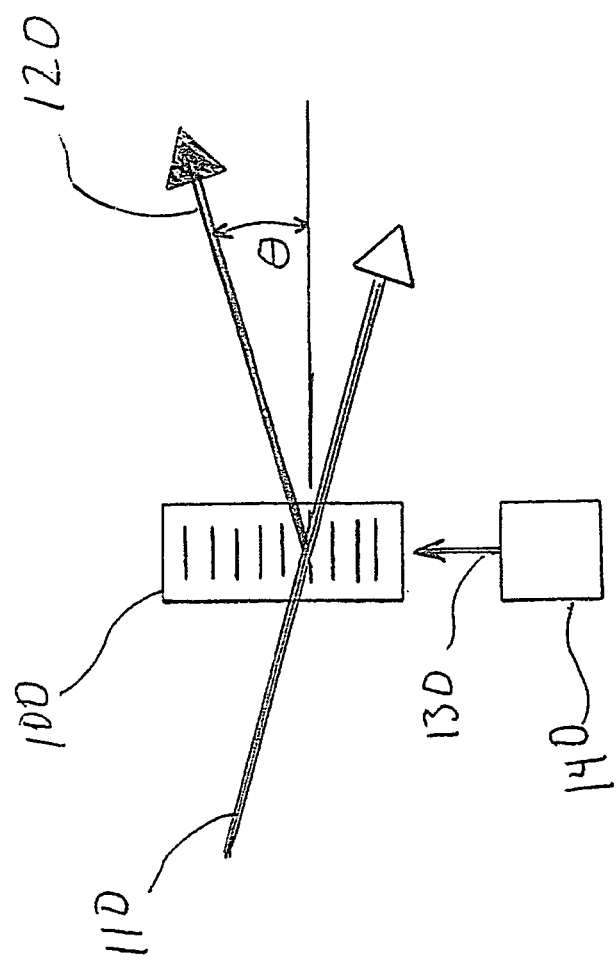
FIG. 1 is a schematic diagram of a prior art acousto-optic deflector with a constant frequency acoustic wave.

Referring initially to FIG. 1, a driver 140 creates an acoustic wave 130 that is transmitted through an acousto-optic deflector (AOD) 100. Acoustic wave 130 has a constant frequency as it is transmitted across AOD 100. AOD 100 also receives an incident light beam 110, a portion of which is diffracted or deflected as a light beam 120, as a result of the interaction between light beam 110 and acoustic wave 130. Deflected light beam 120 is deflected by an amount equal to the angle θ, which is dependent upon the frequency of the acoustic wave 130 (discussed more fully below). Therefore, changing the frequency of acoustic wave 130 changes the angle θ at which incident beam 110 is deflected. As dictated by the principles of the conservation of momentum, deflected light beam 120 will be deflected in the same direction that acoustic wave 130 propagates (i.e., away from driver 140).

Figure 2:
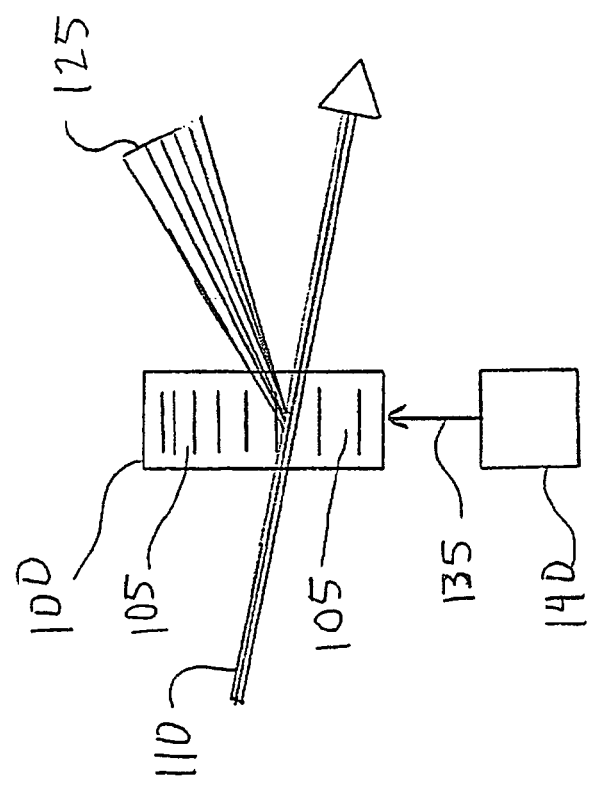
FIG. 2 is a schematic diagram of a prior art acousto-optic deflector with a varying frequency acoustic wave.

In addition, by continuously changing the frequency of the acoustic wave in the acousto-optic medium (a process known as "chirping"), the deflected light beam transmitted from an AOD can be converged or diverged. As shown in FIG. 2, incident light beam 110 is received by AOD 100. In addition, driver 140 creates a chirped acoustic wave 135 that is transmitted through AOD 100. The transmission of the chirped acoustic wave 135 through AOD 100 creates a frequency gradient 105 across AOD 100, such that the frequency of acoustic wave 135 is different at various locations within AOD 100. In the example shown in FIG. 2, the frequency of acoustic wave 135 is lower at the end of AOD 100 which is closest to driver 140 and is higher at the end of AOD 100 which is farthest from driver 140. The configuration shown in FIG. 2 causes a deflected light beam 125 to diverge as it travels away from AOD 100. If the frequency gradient 105 in FIG. 2 were reversed (so that the frequency of acoustic wave 135 was higher at the end closest to driver 140) then deflected light beam 125 would converge rather than diverge.

The converging or diverging effect that chirped acoustic wave 135 has on deflected light beam 125 can be more easily understood if one considers incident light beam 110 to have a finite diameter, such that different portions of incident light beam 110 will contact different positions of AOD 100. Because AOD 100 has a frequency gradient 105 across it, different portions of incident light beam 110 will interact with different frequencies of acoustic wave 135. As previously mentioned, the angle of deflection θ is dependent on the frequency of acoustic wave 135. Therefore, different portions of incident light beam 110 will be deflected by varying angles of deflection θ. As a result, deflected light beam 125 will either converge or diverge, depending on the orientation of frequency gradient 105 with respect to incident light beam 110. In actual operation, an aperture (not shown) on AOD 100 will limit the area on AOD 100 that is exposed to incident light beam 110. However, as the acoustic wave 135 propagates past this aperture, incident light beam 110 will be exposed to the various frequencies in frequency gradient 105, resulting in the convergence or divergence of deflected light beam 125.

Figure 3:
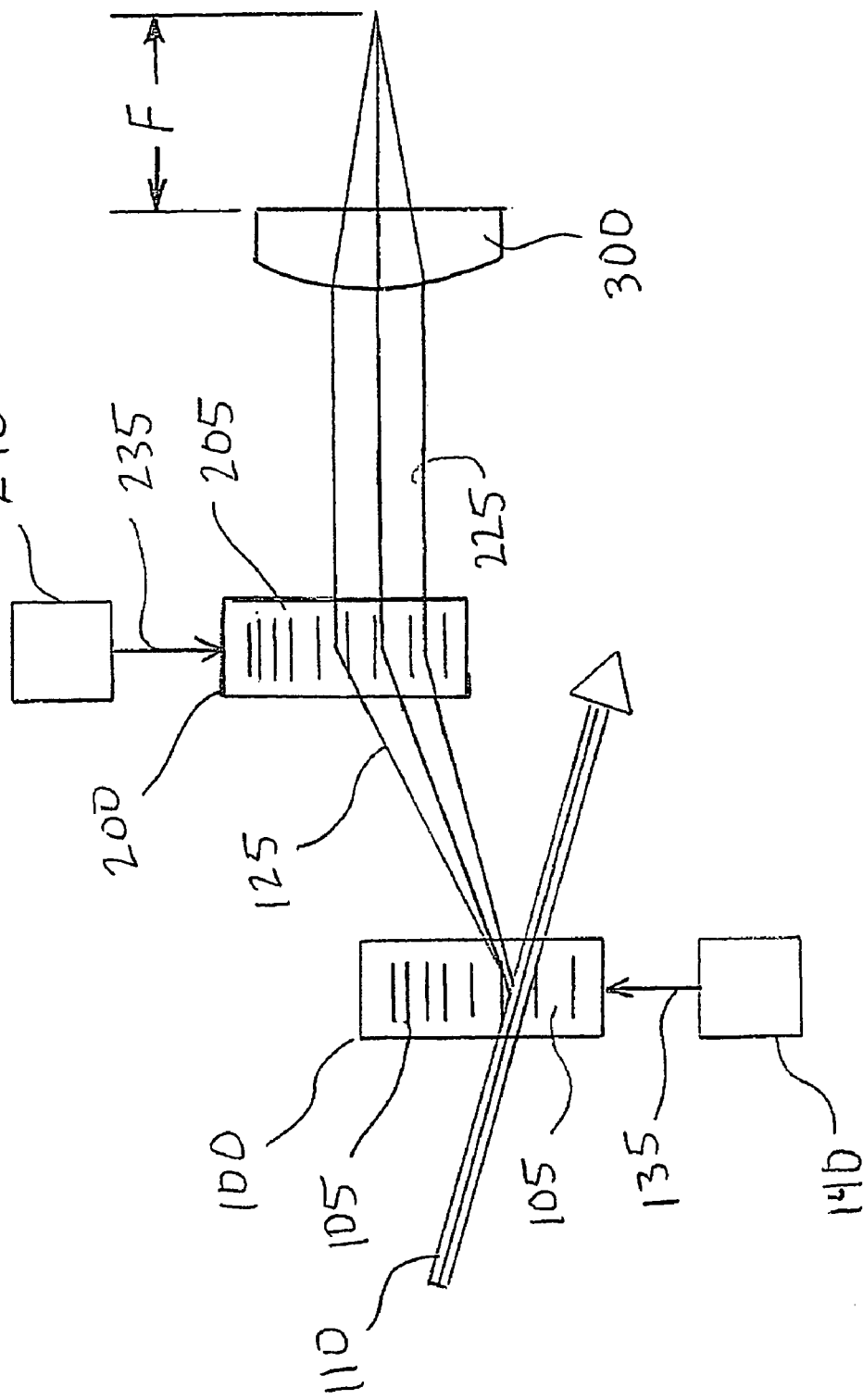
FIG. 3 is a schematic diagram of a pair of acousto-optic deflectors with varying frequency acoustic waves.

Referring now to FIG. 3, a second AOD 200, which is parallel to AOD 100, has been added to the configuration shown in FIG. 2. A chirped high frequency acoustic wave 235 (created by a driver 240) is transmitted through AOD 200. In the embodiment of FIG. 3, acoustic wave 235 is propagated counter to acoustic wave 135. Therefore, the angle of deflection for deflected light beam 225 counteracts the angle of deflection for deflected light beam 125. In the embodiment shown in FIG. 3, frequency gradient 205 has the same "slope" (i.e., change in frequency with respect to time) as frequency gradient 105. However, acoustic wave 235 is a reversed chirp compared to acoustic wave 135 because the higher frequency portion of acoustic wave 235 is closer to driver 240. In contrast, the higher frequency portion of acoustic wave 135 is farther from driver 140. As a result of acoustic wave 235 being a reversed chirp with the same frequency gradient as acoustic wave 135, a deflected beam 225 from second AOD 200 will neither converge nor diverge. Therefore, if deflected beam 225 is passed through an objective lens 300, beam 225 will come into focus at a focal distance F, which is determined by factors such as the geometry and material of objective lens 300.

Figure 4:
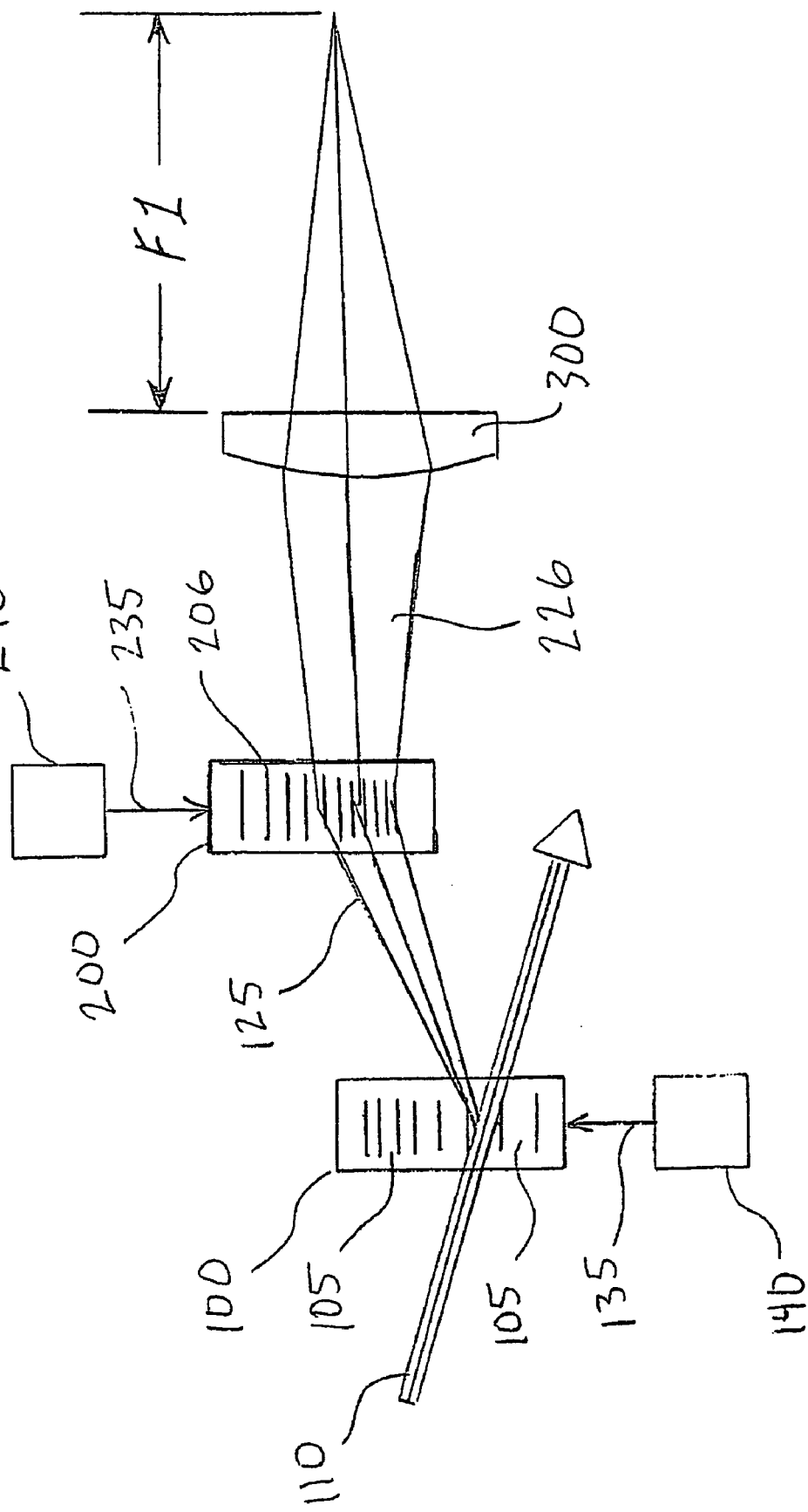
FIG. 4 is a schematic diagram of a pair of acousto-optic deflectors with varying frequency acoustic waves.

Referring now to FIG. 4, the configuration shown is similar to that in FIG. 3. However, in FIG. 4, second AOD 200 has a frequency gradient 206 that has lower frequencies nearest to driver 240 (unlike frequency gradient 205 in FIG. 3, which has higher frequencies nearest to driver 240). As a result, a deflected beam 226 diverges as it emerges from second AOD 200. After diverging deflected beam 226 passes through objective lens 300, it will come into focus at a focal distance F1, which is greater than focal distance F shown in FIG. 3. Therefore, by reversing the frequency gradient in second AOD 200, the axial distance at which deflected beam 226 can be focused is increased.

Figure 5:
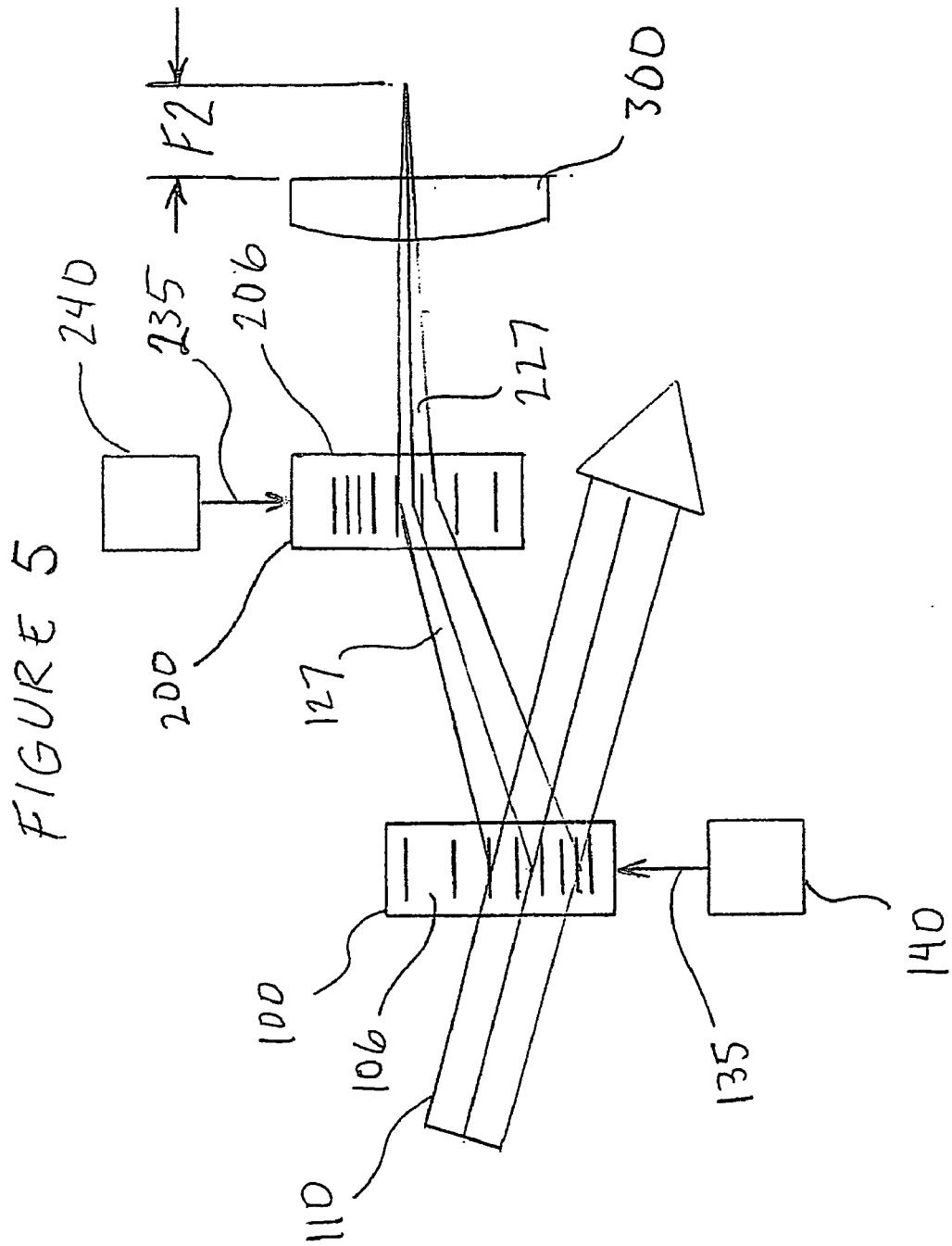
FIG. 5 is a schematic diagram of a pair of acousto-optic deflectors with varying frequency acoustic waves.

Referring now to FIG. 5, the configuration shown is similar to that in FIG. 3. However, in FIG. 5, first AOD 100 has a frequency gradient 106 that has higher frequencies nearest to driver 140 (unlike frequency gradient 105 in FIG.

3, which has lower frequencies nearest to driver 140). As a result, a deflected beam 127 converges as it emerges from first AOD 100. After converging deflected beam 127 passes through second AOD 200, it emerges as a converging deflected beam 227. When converging deflected beam 227 is passed through objective lens 300, it will come into focus at a focal distance F2, which is less than focal distance F shown in FIG. 3. Therefore, by reversing the frequency gradient in first AOD 100, the axial distance at which deflected beam 227 can be focused is decreased. It should be noted that while light beam 110 is depicted with a larger diameter in FIG. 5 than in previous figures, this is only a schematic representation made for purposes of clarity so that the converging effects of AOD 100 can be more clearly illustrated.

As demonstrated above, the orientation of frequency gradients in each of the AODs can be selected to create a diverging, converging or parallel beam from the second AOD. This in turn allows the effective focal distance of an objective lens to be altered, and facilitates scanning in the axial direction. It should be noted that in FIGS. 3–5, the frequencies for acoustic waves 135 and 235 are the same for a given time and location within each AOD. In order to produce lateral scanning, the frequency for acoustic wave 135 must be offset from the frequency range for acoustic wave 235, as discussed more fully in the theoretical discussion of lateral and axial scanning provided below. Therefore, by incorporating counter-propagating waves with offset chirped frequencies, embodiments of the present invention are capable of performing simultaneous lateral and axial scanning without having to physically move components (such as an objective lens). This allows for scan rates in the tens of kilohertz, which are particularly useful for applications such as concurrent monitoring of physiological signals.

The configuration shown in FIGS. 3–5 only allow for lateral scanning in two opposing directions along one axis. Therefore, in order to permit lateral scanning in a second axis, a second pair of parallel AODs are introduced between the first pair of AODs and the objective lens. In preferred embodiments, the second pair of AODs (not shown) are arranged orthogonally to the first pair of AODs, which would then allow lateral scanning in the axis perpendicular to the page. As a result, the use of two pair of parallel AODs with offset and chirped frequencies allows for three-dimensional scanning with scan rates in the tens of kilohertz.

Figure 6:
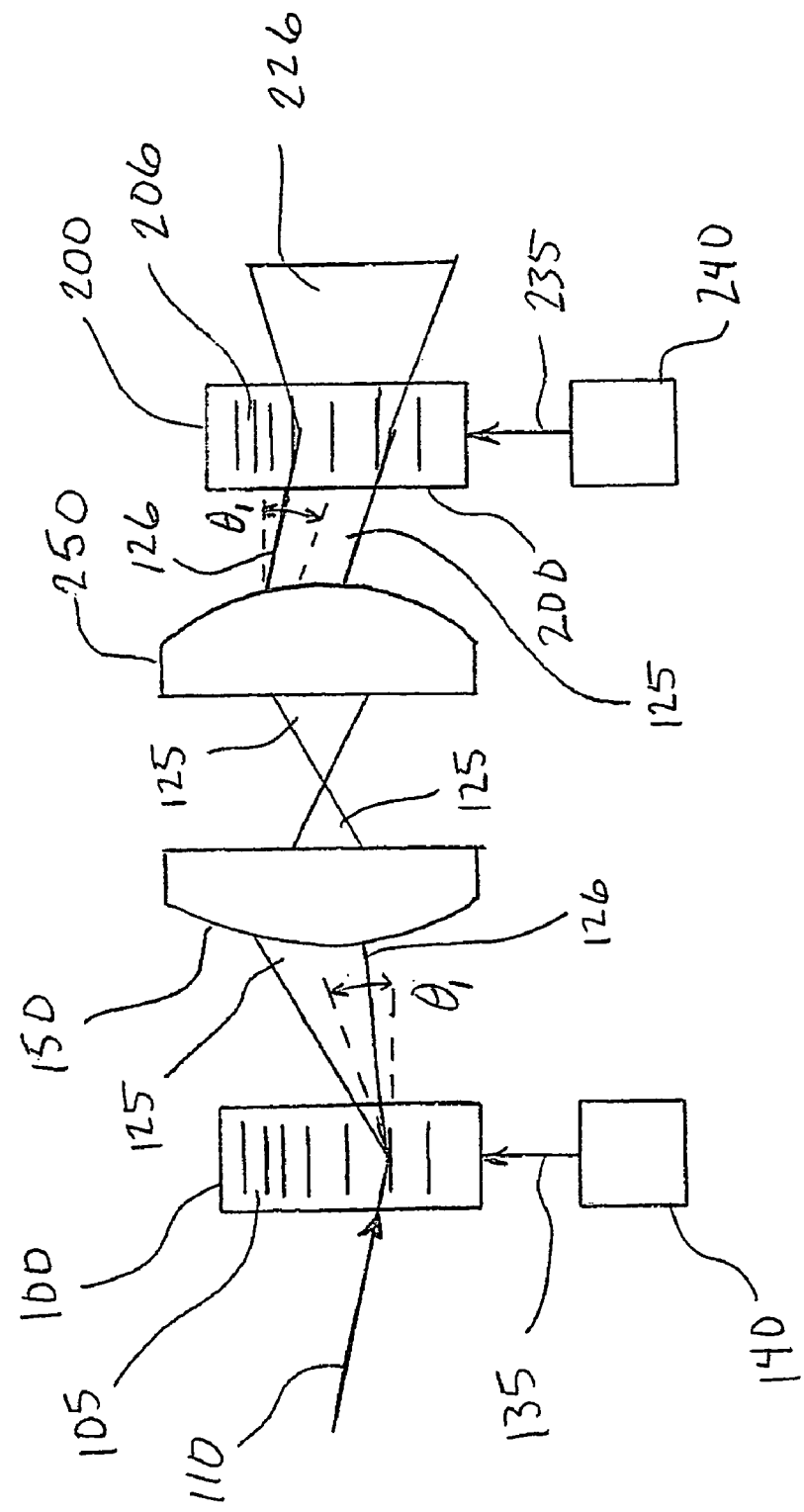
FIG. 6 is a schematic diagram of a pair of acousto-optic deflectors with a pair of telescopic lenses.

Referring now to FIG. 6, a configuration is shown that produces a diverging beam from the second AOD, similar to the configuration of FIG. 4. However, in the configuration shown in FIG. 6, a first lens 150 and second lens 250 are placed between first AOD 100 and second AOD 200. In addition, driver 240 is placed on the same side of AOD 200 as driver 140 is located relative to AOD 100. Therefore, both frequency gradients 105 and 206 are arranged so that the lower frequencies are on the same ends of AOD 100 and AOD 200, respectively.

Lenses 150 and 250 direct deflected light beam 125 towards the center of AOD 200, where the aperture (not shown) is located. This increases the effective scanning frequency by reducing the amount of time that deflected beam 125 does not pass through the aperture of AOD 200. In addition, lenses 150 and 250 reverse the orientation of deflected beam 125 so that acoustic waves 135 and 235 no longer need to be actually counter propagating.

Lenses 150 and 250 reverse deflected beam 125 so that a portion 126 of deflected beam 125 that is closer to the lower frequencies of gradient 105 will be closer to the higher frequencies of gradient 206. Lenses 150 and 250 also reverse the orientation of a deviation angle $\theta_1$, which represents the angle between the center of deflected beam 125 and AODs 100 and 200.

It is important to note that by reversing light beam 125 and deviation angle $\theta_1$, the lens optical relay makes acoustic wave 235 effectively counter-propagating to the acoustic wave 135, even though waves 135 and 235 are traveling in the same direction. A pair of acoustic waves are herein defined to be "effectively counter-propagating" if they are actually counter-propagating (as shown in FIGS. 3–5) or if they are propagating in the same direction, but with the deviation angles and light beam reversed between the acoustic waves (as shown in FIG. 6). As in FIG. 4, the configuration of FIG. 6 therefore produces a diverging beam from second AOD 200.

By reversing the orientation of frequency gradient 206 in FIG. 6 (so that the higher frequencies in frequency gradient 206 are closer to driver 240), a parallel beam would be produced from AOD 200, similar to that shown in FIG. 3. Furthermore, by reversing both frequency gradients 105 and 205 in FIG. 6 (so that the higher frequencies of each are closer to drivers 140 and 240, respectively) a converging beam would be produced from AOD 200, similar to that shown in FIG. 5.

Embodiments of the present invention also compensate for spatial and temporal dispersion. Spatial dispersion of the light beam can create a serious limitation in resolution when utilizing AODs with MPLSM. Spatial dispersion is a direct consequence of the frequency bandwidth found in the ultrafast laser pulses typically used in MPLSM. Embodiments of the present invention largely compensate for spatial dispersion due to the counter-propagating nature of the acoustic waves between the AODs in the parallel pair. A theoretical discussion of the self-compensating nature of this orientation is included below.

In addition to spatial dispersion compensation, embodiments of the present invention also compensate for temporal dispersion by use of a compact multi-pass "pre-chirper". Temporal dispersion is experienced when the incident light entering an AOD is not a single wavelength. By pre-chirping the incident light, the longer wavelength portions of the incident light are delayed with respect to the shorter wavelength portions. Therefore, when the incident light is deflected by the AOD, it will maintain a more consistent wavelength. The use of pre-chirpers is known in the prior art, and preferred embodiments of the present invention incorporate a compact design pre-chirper such as that described in "Compensation of Spatial and Temporal Dispersion for Acousto-Optic Multiphoton Laser-Scanning Microscopy" by V. Iyer, B. Losavio, and P. Saggau, J. of Biomedical Optics 8(3), 460–471, July 2003, incorporated herein by reference.

Embodiments of this invention can be used in numerous fields, such as laser-scanning microscopy, specifically multiphoton microscopy. In conventional laser-scanning microscopy, a laser beam is focused by an objective lens on a specimen to excite fluorescent molecules, and the emitted fluorescence is collected and analyzed. If multiple sites on the specimen are to be probed, then the beam focus is sequentially moved from site to site.

Commonly, such two-dimensional lateral scanning schemes employ mechano-optic scanners, e.g. galvanometer-driven mirrors. In order to obtain three-dimensional scanning pattern, the objective lens is then repositioned in the axial direction in addition to the lateral scanning. For structural imaging, i.e. systematic three-dimensional scanning of a time-invariant spatial fluorescence distribution, this mechano-optic scanning scheme is usually sufficient. However, if functional imaging is required, i.e. multi-site probing of rapidly time-variant fluorescence, such inertia-limited scanning schemes seriously constrain the spatio-temporal resolution and often render desired imaging studies impossible.

As described above, embodiments of the present invention eliminate these constraints by using acousto-optic deflectors (AODs) to independently control two-dimensional collimation and two-dimensional lateral positioning of a light beam. In the case of multi-photon microscopy, pulsed light sources, such as an ultra-fast laser, are commonly used for fluorescence excitation. Such light sources emit trains of very short light pulses, e.g. <100 femtoseconds (1 fs=$10^{-15}$s) to several picoseconds (1 ps=$10^{-12}$s), at a very high frequency, e.g. 80–100 Mhz (1 Mhz=$10^6$/s). This short pulse duration is essential for the multi-photon excitation rate of fluorescence, however, dispersive optical elements such as AODs will result in both temporal dispersion (decreasing the multi photon fluorescence rate by increasing the pulse duration and thus decreasing the pulse intensity) and spatial dispersion (significantly decreasing the spatial resolution by increasing the fluorescence excitation volume). These dispersions are commonly compensated by additional diffractive elements. In embodiments of the present invention, the counter-propagating nature of the acoustic waves in the four employed AODs is such that spatial dispersion is largely self-compensated. In addition, the pre-chirper system described above also compensates for temporal dispersion.

Figure 7:
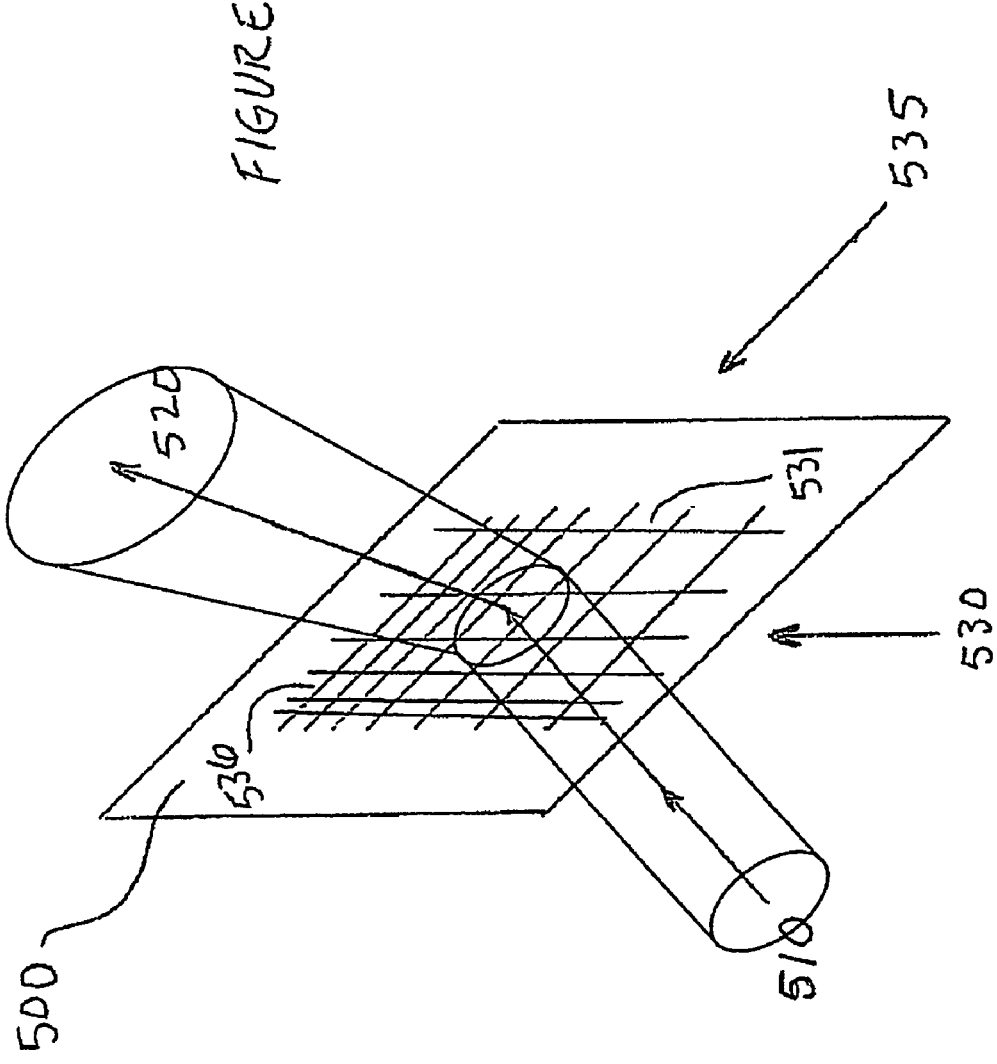
FIG. 7 is a schematic diagram of a single acousto-optic deflector with orthogonal acoustic waves.

As described above, embodiments of the present invention can combine a first pair of parallel AODs (such as those shown in FIGS. 3–6) with a second pair of parallel AODs arranged orthogonally to the first pair of AODs to allow for three-dimensional scanning. In other embodiments, however, multiple acoustic waves may be used in a single AOD to reduce the total number of AODs needed for three-dimensional scanning. Referring now to FIG. 7, an incident light beam 510 is passed through an AOD 500, which deflects a light beam 520. A first acoustic wave 530 is passed through AOD 500, while a second acoustic wave 535 is also passed through AOD 500. Second acoustic wave 535 is propagated in a direction that is different than first acoustic wave 530; in preferred embodiments, second acoustic wave is orthogonal to first acoustic wave 530. First and second acoustic waves 530 and 535 each have a frequency gradient 531 and 536, respectively, across AOD 500 that is increasing in the direction of the arrows representing sound waves 530 and 535. In addition, the frequencies of acoustic waves 530 and 535 are offset. As shown in FIG. 7, an incident light beam 510 is received by AOD 500 at an angle oblique or perpendicular to the plane of AOD 500. A portion of incident light beam 510 is then deflected as light beam 520. The orientation of incident light beam 510 to AOD 500 and frequency gradients 531 and 536 will determine whether light beam 520 is converging or diverging. In the example shown in FIG. 7, light beam 520 is diverging.

Figure 8:
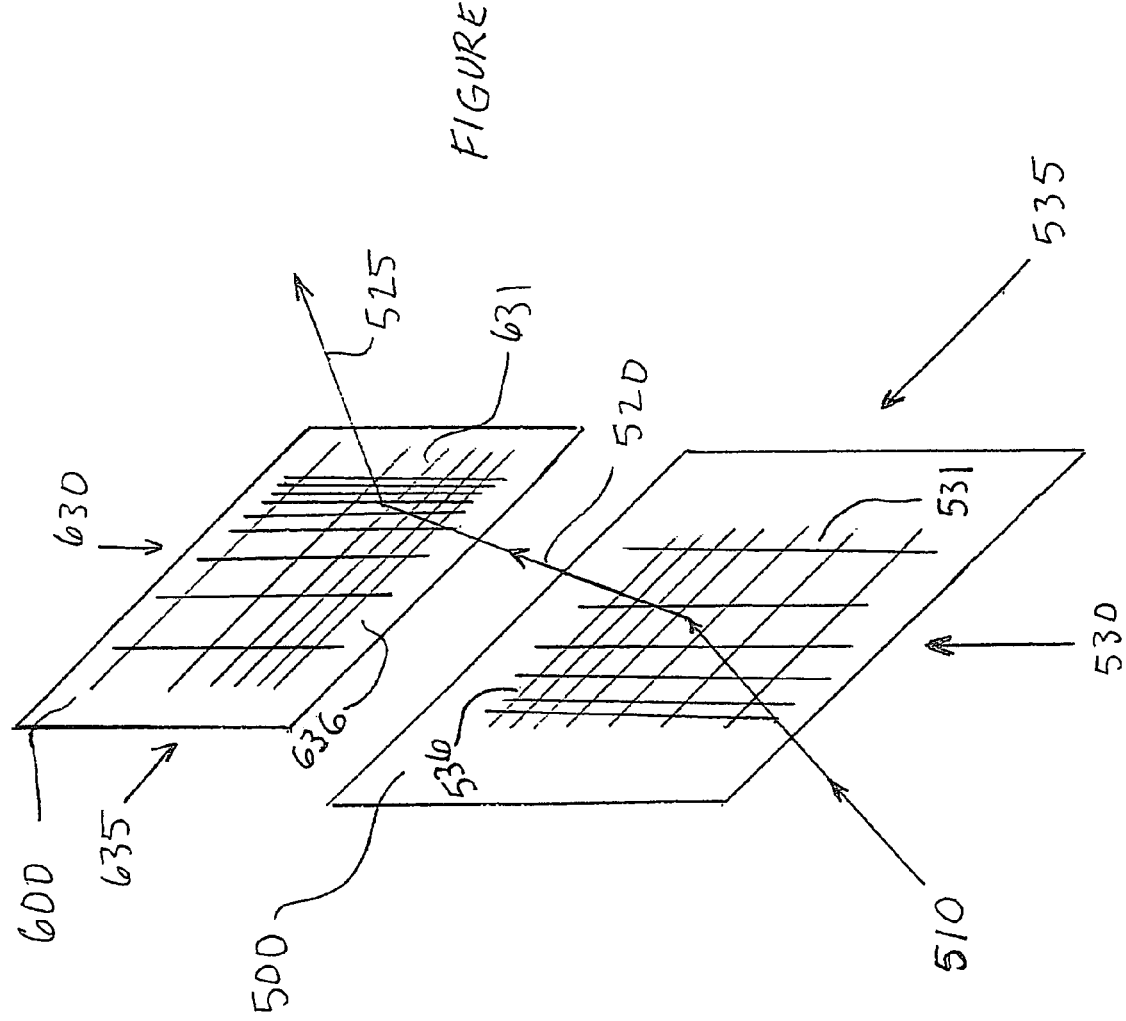
FIG. 8 is a schematic diagram of a pair of acousto-optic deflectors with orthogonal acoustic waves.

Referring now to FIG. 8, an AOD 600 is shown that is parallel to AOD 500. Similar to AOD 500, AOD 600 also includes a sound wave 630 with a frequency gradient 631 and a sound wave 635 with a frequency gradient 636. However, sound wave 630 is propagated in a direction that is counter to sound wave 530 and sound wave 635 is propagated in a direction that is counter to sound wave 535. Therefore as light beam 520 (which is shown as a single line for clarification purposes) is received by AOD 600, a portion of light beam 520 is deflected as light beam 525 by AOD 600.

As shown in FIG. 8, by combining two acoustic waves in a single AOD, the number of AODs necessary for three-dimensional scanning is reduced from four to two. The basic principle of operation remains the same as that described in previous embodiments: by using effectively counter-propagating sound waves with frequencies that are offset and have a frequency gradient across the AOD, a light beam can be simultaneously scanned in the lateral and axial directions, with independent control of the light beam in both the lateral and axial directions. The orientation of frequency gradients 531, 536, 631 and 636 will determine the axial scanning (or the collimation) of light beam 525, i.e. whether light beam 525 is converging or diverging. The offset in the frequencies of acoustic waves 530 and 535, as well as acoustic waves 630 and 635, will control the lateral scanning of light beam 525.

Although not illustrated because of issues of clarity, other embodiments of the present invention comprise four acoustic waves (such as acoustic waves 530, 535, 630, and 635) within a single AOD. As described in FIG. 8, the four acoustic waves comprise two pair of effectively counter-propagating waves with offset frequencies and a frequency gradient across the AOD. The same principles of operation described previously would control the lateral and axial scanning of a light beam deflected by a single AOD with two pairs of effectively counter-propagating acoustic waves with offset and chirped frequencies.

While preferred embodiments of this invention have been shown and described, modifications thereof can be made by one skilled in the art without departing from the scope of this invention. The embodiments described herein are exemplary only and are not limiting. For example, while multiphoton microscopy has been provided as one application for the scanning system described within, other applications exist as well. For instance, the scanning system described within could also be used in semiconductor lithography or the fabrication of micro-electromechanical systems (MEMS). Likewise, unless explicitly stated otherwise, the sequential recitation of steps in the claims is not intended to require that the steps be performed sequentially, or that a particular step be concluded before another step is commence. Accordingly, the scope of protection is not limited to the embodiments described herein, but is only limited by the claims that follow, the scope of which shall include all equivalents of the subject matter of the claims Theoretical Discussion of Axial Scanning AODs can be viewed as tunable diffraction gratings, where the wavelength of the acoustic wave propagating through the AO medium, e.g., a tellurium dioxide ($TeO_2$) crystal, corresponds to the grating constant. Therefore, changing the frequency of the acoustic wave changes the angle by which the incoming beam is deflected. When operated in the Bragg regime, where the Klein and Cook parameter (Q) [as defined in *Electro-Optic and Acousto-Optic Scanning and Deflection* by M. Gottlieb, C. L. M. Ireland, and J. M. Ley, Marcel Dekker Inc., New York (1983), incorporated herein by reference] is much greater than one, the first order angle of deviation θ can be described by $$\theta = \frac{\lambda}{\Lambda} = \frac{\lambda f}{v}, \quad \text{(Eqn. 1)}$$

where λ is the wavelength of the laser light, Λ is the acoustic wavelength, f is the acoustic frequency (Note: throughout this document, frequencies and changes in frequencies will be denoted by f, whereas focal lengths and changes in focal length will be denoted by F), and v is the acoustic velocity in the AOD.

If acoustic frequency is changed in time, both the frequency and the angle of deviation can be represented as time-dependent functions f(t) and θ(t), where Eqn. 1 still holds. If the chirped acoustic frequencies are considered, where f(t) constantly changes, the deflection angle θ(x, t) at any point x in the aperture of the AOD can be defined as follows:

$$\theta(x, t) = \frac{\lambda}{v} f\left(t - \frac{x}{v}\right), \quad \text{(Eqn. 2)}$$

where x=0 has, without loss of generality, been chosen to be at the center of the AOD aperture and the positive x direction has been chosen to be in the direction of the deflection. It can be seen from this equation that if the acoustic frequency in time (chirp) is linearly changed with a given frequency/time value of α, i.e., let f(t)=$f_{min}$+αt, where $f_{min}$ is the lowest acoustic frequency in the bandwidth, α=(f-$f_{min}$)/$T_{scan}$=Δf/$T_{scan}$, and $T_{scan}$ is the duration of the chirp, then the angle of deflection can be defined at any time by:

$$\theta(x, t) = \frac{\lambda}{v}(f_{\min} + \alpha t) - \frac{\lambda \alpha}{v^2} x \quad \text{(Eqn. 3)}$$

This equation describes a converging cylindrical lens with a focal length equal to F=$v^2$/λα=$v^2 T_{scan}$/λΔf, whose central axis of propagation changes from a minimum angle of θ=λ$f_{min}$/v at the beginning of the scan to a maximum of θ=λf/v at the end of the scan. Note that a diverging cylindrical lens can also be produced by using a negative chirp (i.e., let f(t)=f−αt). Thus, a single AOD with a linearly chirped acoustic signal can be modeled as a cylindrical lens with a time-varying central optical axis.

If we then telecentrically relay the aperture of this AOD to another AOD (FIG. 1c), we can describe the total deflection angle by:

$$\theta(x, t) = \frac{\lambda}{v}\left[-f_1\left(t + \frac{x}{v}\right) + f_2\left(t - \frac{x}{v}\right)\right], \quad \text{(Eqn. 4)}$$

where $f_1(t)$ is the time-dependent acoustic frequency in the AOD 100 and $f_2(t)$ is the time-dependent acoustic frequency in the AOD 200. It is important to note that by reversing the light beam and deviation angles, the optical relay effectively makes the acoustic wave 235 counter-propagating relative to the acoustic wave 135.

If the acoustic frequencies are designated by $f_1(t)=f_2(t)=f_{min}$+αt, the total deviation angle can be represented as follows:

$$\theta(x, t) = -\left(2\alpha \frac{\lambda}{v^2}\right) x \quad \text{(Eqn. 5)}$$

This equation now describes a converging cylindrical lens with a central axis of propagation that is time-independent. The focal length of this acousto-optic lens (AOL), $$F_{AOL,conv} = \frac{v^2}{2\lambda\alpha} = \frac{v^2 T_{scan}}{2\lambda\Delta f}, \quad \text{(Eqn. 6)}$$

is in agreement with published results [A. Kaplan, N. Friedman, N. Davidson, "Acousto-optic lens with very fast focus scanning", *Opt. Let.*, 26(14), 1078–1080 (2001), incorporated herein by reference] but arranged so that no off-axis deviation is introduced. Thus, for each chirp value α, a specific axial focal position is obtained. Note that if $f_1(t)=f_2(t)$=f−αt is used for chirp frequencies, this results in a diverging cylindrical lens with a focal length of $F_{AOL,dir}$=−$v^2$/2λα=−$v^2 T_{scan}$/2λΔf.

Theoretical Discussion—Three-Dimensional Imaging with Lateral and Axial Scanning If the AOD configuration shown in FIGS. 3–6 is used with offsets in the acoustic frequency (i.e., let $f_1(t)=f_{min}$+αt+$f_{1offset}$ and $f_2(t)=f_{min}$+αt+$f_{2offset}$), we find that the total angle of deflection according to Eqn. 4 can be described by $$\theta(x, t) = -\left(2\alpha \frac{\lambda}{v^2}\right) x + (f_{2offset} - f_{1offset})\frac{\lambda}{v}. \quad \text{(Eqn. 7)}$$

The first part of the right hand side of this equation is identical to the purely axial case (Eqn. 5) and once again describes a cylindrical lens with a focal length defined by Eqn. 6. The second part of the equation defines a time-independent lateral deflection angle $$\theta_{lateral} = (f_{2offset} - f_{1offset})\frac{\lambda}{v} = \Delta f_{offset} \frac{\lambda}{v} \quad \text{(Eqn. 8)}$$

that is mathematically independent of the focal length and, therefore, the axial focal position. It is shown that when $f_{2offset}=f_{max}\{f_{min}\}$, where $f_{max}$ is the maximum frequency in the acoustic bandwidth, and $f_{1offset}=f_{min}\{f_{max}\}$, a maximal {minimal} scan angle of $\theta_{lateral}$=(Δ$f_{bandwidth}$)λ/v{−(Δ$f_{bandwidth}$)λ/v} is obtained, where Δ$f_{bandwidth}$ is a change in acoustic frequency which is equal to the entire acoustic bandwidth. This gives a total scan range of Δ$\theta_{lateral}$=2(Δ$f_{bandwidth}$)λ/v. It is important to note that to utilize the maximal lateral scan range, there can be no frequency chirp and thus no axial scanning, a property discussed more fully below.

Theoretical Discussion—Spatial Dispersion Compensation

The resolution of an AOD is typically defined by the number of resolvable points (NRP) that can be obtained in the far field, which equals the NRP that can be obtained in the focal plane of an objective lens (if the back focal aperture is filled). This value is defined by the total scan range of the AOD (Δ$\theta_{scan}$), which for single AOD operation is defined as $$\Delta\theta_{scan} = \frac{\lambda \Delta f_{bandwidth}}{v}, \quad \text{(Eqn. 9)}$$

(where Δ$f_{bandwidth}$ is the acoustic bandwidth) divided by the minimum spot size. When monochromatic light sources such as continuous wave (CW) lasers are used, the minimum spot size is the diffraction limit which, using the Rayleigh criterion, can be approximated by $$\Delta\theta_{diffraction} \sim \frac{\lambda}{d}, \quad \text{(Eqn. 10)}$$

where d is the effective aperture size of the AOD. However, when light with a significant frequency bandwidth propagates through an AOD, there is an angular spread (spatial dispersion) at any given acoustic frequency which can be described as $$\Delta\theta_{dispersion} = \frac{\Delta\lambda f}{v} \quad \text{(Eqn. 11)}$$

When this dispersion is significantly larger than the diffraction limit, it almost exclusively determines the effective spot size. For a tellurium dioxide (TeO$_2$) AOD with an acoustic velocity v~620 m/s and an acoustic bandwidth from 60 Mhz to 100 Mhz, even at the lowest acoustic frequency, the dispersion angular spread is already ~10 times the size of the diffraction limited angular spread (assuming a beam diameter of ~10 mm and a 100 fs Gaussian pulse with a time bandwidth product of 0.441 and λ~850 nm, which makes Δλ~10.6 nm). This dispersion decreases the resolution (the number of resolvable spots) by at least a factor of 10.

Figure 9:
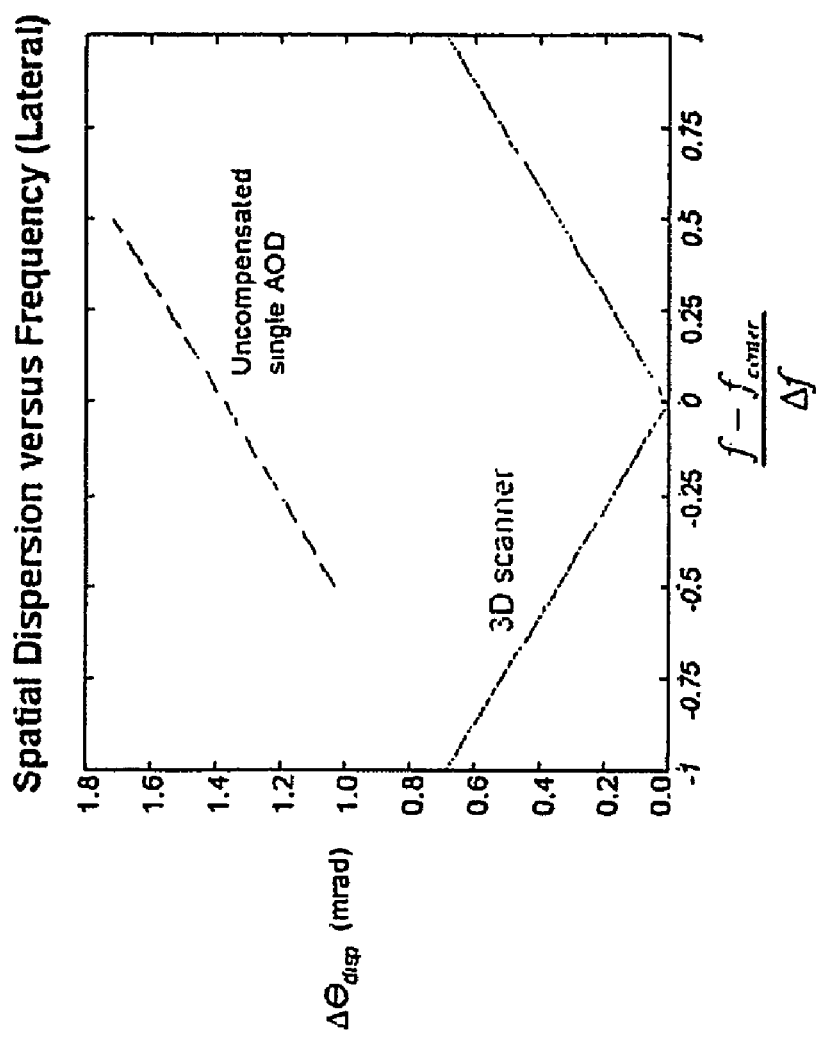
FIG. 9 is a chart of spatial dispersion versus lateral frequency.

However with our 3D scanning scheme, the lateral scan position is determined by Eqn. 8. Thus, the effective bandwidth of the system is from $-\Delta f_{bandwidth}$ to $+\Delta f_{bandwidth}$, which for the TeO$_2$ AOD described above is from −40 Mhz to +40 Mhz. Using Eqn. 12, we see that this implies that at the center frequency, the angular spread due to dispersion is completely eliminated while at extreme scan angles (worst case), the angular spread is only ⅔ of the minimum spread of the single AOD case. Referring now to FIG. 9, a graphical representation is depicted of the spatial dispersion ($\Delta\theta_{disp}$) versus the lateral frequency [(f−f$_{center}$)/Δf].

However, by utilizing two AODs, we have also effectively doubled our scan range from $\Delta\theta_{scan}$ to $2\Delta\theta_{scan}$. Therefore, this scheme results in a minimum improvement in NRP of three-fold over the uncompensated case at the extreme scan angles and a progressive increase in NRP towards the center.

Limits of Lateral and Axial Scan Ranges

Figure 10:
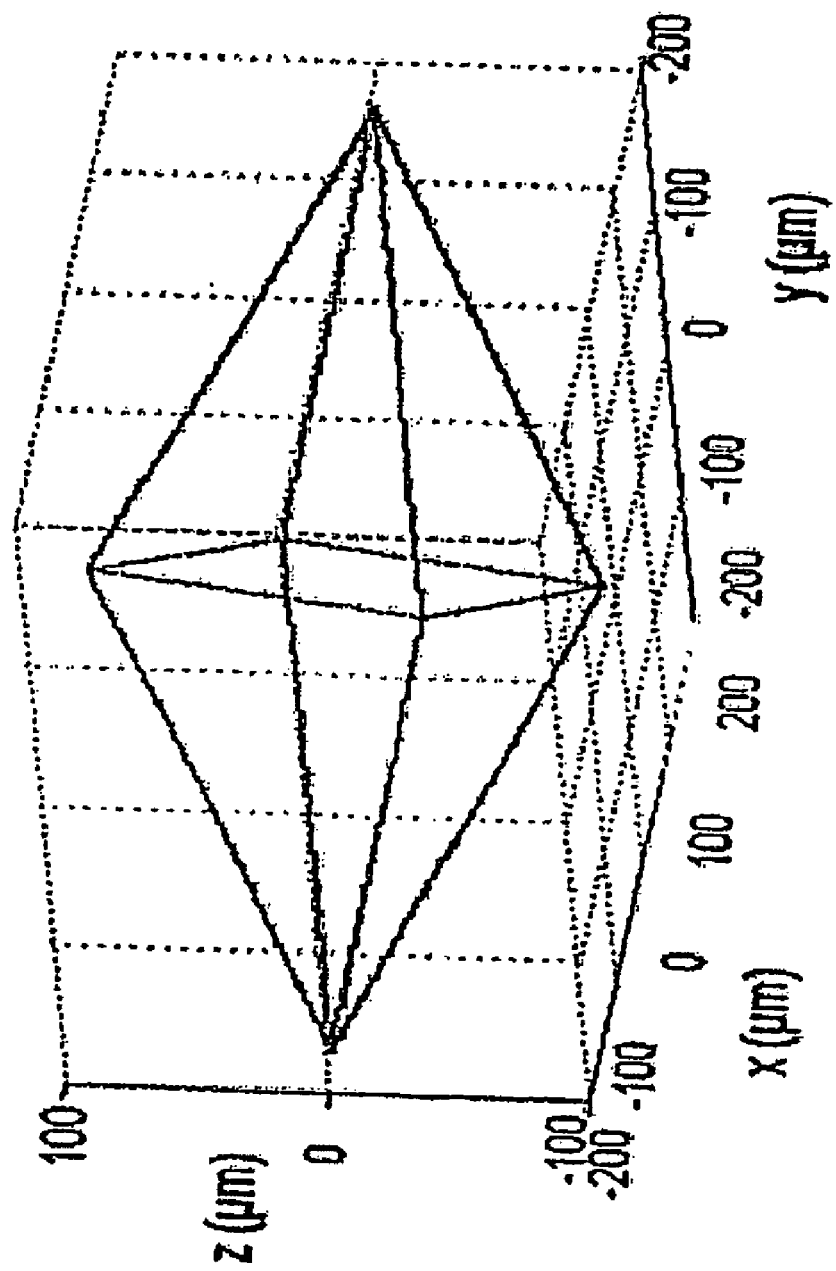
FIG. 10 is a three dimensional graph of the range of the scan pattern.

While the positions of both the lateral and axial focus are mathematically independent of each other, practically they are linked by a finite acoustic bandwidth which must be shared between the two, i.e., $\Delta f_{total} = \Delta f_{lateral} + \Delta f_{axial}$. Thus, as mentioned above, the full lateral scan range is only available when there is no axial scan. Similarly, the full axial scan range is only available when there is no lateral scan. The overall scan pattern therefore resembles two pyramids attached to each other at their bases (see FIG. 10). Also, it is important to note that the lateral and axial resolutions are not equivalent. To show this, the equations for both lateral and axial resolution are examined. The lateral resolution attainable by embodiments of the present invention has been described above, and can be represented as the total scan range divided by the minimum spot size. Therefore, if we ignore spatial dispersion, the NRP can be expressed as $$NRP_{lateral} = \frac{\left(\frac{\lambda \Delta f_{lateral}}{v}\right)}{\frac{\lambda}{d}} = \frac{d}{v}\Delta f_{lateral}, \quad \text{(Eqn. 12)}$$

where d represents the size of the AOD aperture. Similarly in the axial dimension, the NRP according to Kaplan et al.[26], can be expressed as $$NRP_{axial} = \left(\frac{4\pi}{\eta}\right)\frac{(d/v)^2}{T_{scan}}\Delta f_{axial}, \quad \text{(Eqn. 13)}$$

where η is a constant that depends on the beam shape (~7 for a constant intensity laser beam).

Note that both of the above equations assume a constant lateral and axial resolution throughout the entire scan pattern. However, we have already described in the discussion of spatial dispersion compensation how the resolution will change as a result of spatial dispersion if used in MPLSM. Another source of resolution reduction results from an effective drop in numerical aperture (NA), which is a quantitative measurement of the resolution of the system, at axial distances further than the objective plane. We can calculate the smallest NA, which will occur at the farthest axial point, as $$NA_{min} = n(\sin\theta_{min}) = n\frac{D}{2\left((Wd + \Delta F)^2 + \left(\frac{D}{2}\right)^2\right)^{\frac{1}{2}}}, \quad \text{(Eqn. 14)}$$

where Wd is the working distance of the objective lens, D is the diameter of the front lens of the objective, and $\Delta F = F_{total} - F_{obj}$ is the distance between the furthest axial focal position and the objective focal plane. For a 60× water immersion lens with an NA of 1.0 and a working distance of 2.0 mm, if we had a ΔF of 100 μm, then the NA$_{min}$ is 0.98. This implies a 2% maximum increase in lateral spot size and a 4% maximum increase in axial spot size.

What is claimed is:

1. A system for controlling the lateral position and collimation of a light beam comprising:
   a first acousto-optic deflector capable of changing the collimation of the light beam and deflecting the light beam in a first lateral direction;
   a second acousto-optic deflector capable of changing the collimation of the beam and deflecting the light beam in a second lateral direction;
   a first acoustic wave propagated through said first acousto-optic deflector, said first acoustic wave having a frequency gradient across said first acousto-optic deflector;
   a second acoustic wave propagated through said second acousto-optic deflector, wherein:
   said second acoustic wave is effectively counter-propagating to said first acoustic wave;
   said second acoustic wave has a frequency gradient across said second acousto-optic deflector and said second acoustic wave has a frequency with an offset from said first acoustic wave frequency.
2. The system of claim 1 further comprising:
   a third acousto-optic deflector capable of changing the collimation of the light beam and deflecting the light beam in a third lateral direction;
   a fourth acousto-optic deflector capable of changing the collimation of the beam and deflecting the light beam in a fourth lateral direction;

a third acoustic wave propagated through said third acousto-optic deflector, said third acoustic wave having a frequency gradient across said third acousto-optic deflector;

a fourth acoustic wave propagated through said fourth acousto-optic deflector, wherein:

said fourth acoustic wave is effectively counter-propagating to said third acoustic wave;

said fourth acoustic wave has a frequency gradient across said fourth acousto-optic deflector and said fourth acoustic wave has a frequency with an offset from said third acoustic wave frequency.

3. The system of claim 2, further comprising an objective lens, wherein:

said objective lens focuses said light beam at a focal point with an axial position and a lateral position; and the frequency gradients of said first, second, third and fourth acoustic waves affect the axial position of said focal point and the offset of said second and fourth acoustic waves affect the lateral position of said focal point.

4. The system of claim 3, wherein the axial position and lateral position of said focal point can be moved without moving the objective lens.

5. The system of claim 2 wherein the axial position or the lateral position of said focal point can be moved more than 1,000 times per second.

6. The system of claim 2, wherein said first acousto-optic deflector is parallel to said second acousto-optic deflector and said third acousto-optic deflector is parallel to said fourth acousto-optic deflector.

7. The system of claim 2, wherein said third and fourth acousto-optic deflectors are arranged orthogonally to said first and second acousto-optic deflectors.

8. The system of claim 2, wherein said second acousto-optic deflector inherently compensates for a spatial dispersion of the light beam by said first acousto-optic deflector and said fourth acousto-optic deflector inherently compensates for a spatial dispersion of the light beam by said third acousto-optic deflector.

9. The system of claim 2, wherein said fast lateral direction and said second lateral direction are in a first lateral plane and said third lateral direction and said fourth lateral direction are in a second lateral plane.

10. The system of claim 2, wherein said first, second, third, and fourth acousto-optic deflectors comprise a spatial dispersion-compensated three-dimensional scanner.

11. The system of claim 2, further comprising:
a pulsed infrared laser;
a temporal dispersion compensator; and
an objective lens.

12. The system of claim 1, wherein said light beam is emitted from a pulsed infrared laser.

13. The system of claim 12, wherein said pulsed infrared laser emits a plurality of light pulses approximately 1 picosecond ($10^{-12}$ seconds) in duration.

14. The system of claim 12, wherein said pulsed infrared laser emits a plurality of light pulses approximately 100 femtoseconds ($10^{-13}$ seconds) in duration and said plurality of light pulses are compensated for temporal dispersion.

15. The system of claim 12, wherein said pulsed infrared laser emits light pulses at a frequency between approximately 80 Mhz and approximately 100 Mhz.

16. A system for controlling the lateral position and collimation of a light beam comprising:

an acousto-optic deflector; and a first acoustic wave, a second acoustic wave, a third acoustic wave and a fourth acoustic wave, wherein:

each of said first, second, third and fourth acoustic waves are propagated with a frequency gradient across said acousto-optic deflector;

said first acoustic wave is effectively counter-propagating to said second acoustic wave;

said first acoustic wave has a frequency offset from said second acoustic wave;

said third acoustic wave is effectively counter-propagating to said fourth acoustic wave; and said third acoustic wave has a frequency offset horn said fourth acoustic wave.

17. A system for controlling the lateral position and collimation of a light beam comprising:

a first acousto-optic deflector;

a first acoustic wave that is propagated across said first acousto-optic deflector;

a second acoustic wave that is propagated across said first acousto-optic deflector, wherein said first and second acoustic waves have frequency gradients across said first acousto-optic deflector and said first acoustic wave is effectively counter-propagating to said second acoustic wave;

a second acousto-optic deflector;

a third acoustic wave that is propagated across said second acousto-optic deflector;

a fourth acoustic wave that is propagated across said second acousto-optic deflector, wherein said third and fourth acoustic waves have frequency gradients across said second acousto-optic deflector and said third acoustic wave is effectively counter-propagating to said fourth acoustic wave.

* * * * *

UNITED STATES PATENT AND TRADEMARK OFFICE
CERTIFICATE OF CORRECTION

| | | |
|---|---|---|
| PATENT NO. | : 7,227,127 B2 | |
| APPLICATION NO. | : 11/245410 | |
| DATED | : June 5, 2007 | |
| INVENTOR(S) | : Peter Saggau, Duemani Reddy and Vijay Iyer | |

It is certified that error appears in the above-identified patent and that said Letters Patent is hereby corrected as shown below:

In the Specification

In Column 1, Line 20, after "Grant No.", delete "DBI-0130852" and replace it with -- DBI-0138052 --

In Column 1, Line 21, after "Foundation." Please add -- The Government has certain rights in the invention. --

Signed and Sealed this
Twentieth Day of May, 2014

Michelle K. Lee
*Deputy Director of the United States Patent and Trademark Office*